(12) United States Patent
Smith et al.

(10) Patent No.: US 9,598,096 B2
(45) Date of Patent: *Mar. 21, 2017

(54) SHOPPING CART

(71) Applicant: Unarco Industries LLC, Wagoner, OK (US)

(72) Inventors: Woody Smith, Stillwater, OK (US); Wesley McMurtrey, Wagoner, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,645

(22) Filed: Apr. 4, 2016

(65) Prior Publication Data
US 2016/0280245 A1 Sep. 29, 2016

Related U.S. Application Data

(63) Continuation of application No. 14/287,636, filed on May 27, 2014, now Pat. No. 9,302,692.

(60) Provisional application No. 61/828,115, filed on May 28, 2013.

(51) Int. Cl.
B62B 3/14 (2006.01)
B62B 5/06 (2006.01)

(52) U.S. Cl.
CPC .............. B62B 3/14 (2013.01); B62B 3/1404 (2013.01); B62B 5/06 (2013.01); B62B 2501/067 (2013.01)

(58) Field of Classification Search
CPC .... B62B 3/14; B62B 3/1496; B62B 2501/067
USPC ..................................... 280/DIG. 4
See application file for complete search history.

(56) References Cited

U.S. PATENT DOCUMENTS

| 3,015,494 | A | | 1/1962 | Fosbrook, Sr. |
| 3,026,122 | A | | 3/1962 | Young |
| 4,544,171 | A | * | 10/1985 | Kellogg .................. B62B 3/18 280/33.992 |
| 4,850,604 | A | | 7/1989 | Le Marchand et al. |
| 5,553,876 | A | * | 9/1996 | Trubiano .............. B62B 3/1472 224/411 |
| 7,090,230 | B2 | | 8/2006 | O'Quin |
| 7,168,711 | B2 | * | 1/2007 | Ondrasik ............. B62B 3/1404 280/33.991 |
| 7,673,886 | B2 | | 3/2010 | Ondrasik |
| 8,096,564 | B2 | * | 1/2012 | Berthiaume ........ B29C 45/1704 280/33.992 |

* cited by examiner

Primary Examiner — Bryan Evans
(74) Attorney, Agent, or Firm — Banner & Witcoff, Ltd.

(57) ABSTRACT

A shopping cart features a frame forming a chassis portion and a handle portion. A number of casters are attached to the chassis portion while a basket attached to the handle portion. A pair of basket supports are positioned on opposite sides of the basket. The pair of basket supports include a pair of base portions connected to the chassis portion, a pair of forward tilting lower portions attached to the base portions, and a pair of rearward tilting upper portions attached to the pair of forward tilting lower portions.

18 Claims, 4 Drawing Sheets

SHOPPING CART

CLAIM OF PRIORITY

This application is a continuation of pending U.S. patent application Ser. No. 14/287,636 filed May 27, 2014, which claims priority to U.S. Provisional Application No. 61/828,115, filed on May 28, 2013, the contents of which are each incorporated herein by reference.

FIELD OF THE INVENTION

The present invention relates generally to shopping carts and, in particular, to a shopping cart that includes a support for the basket.

DETAILED DESCRIPTION OF EMBODIMENTS

Figure 1:
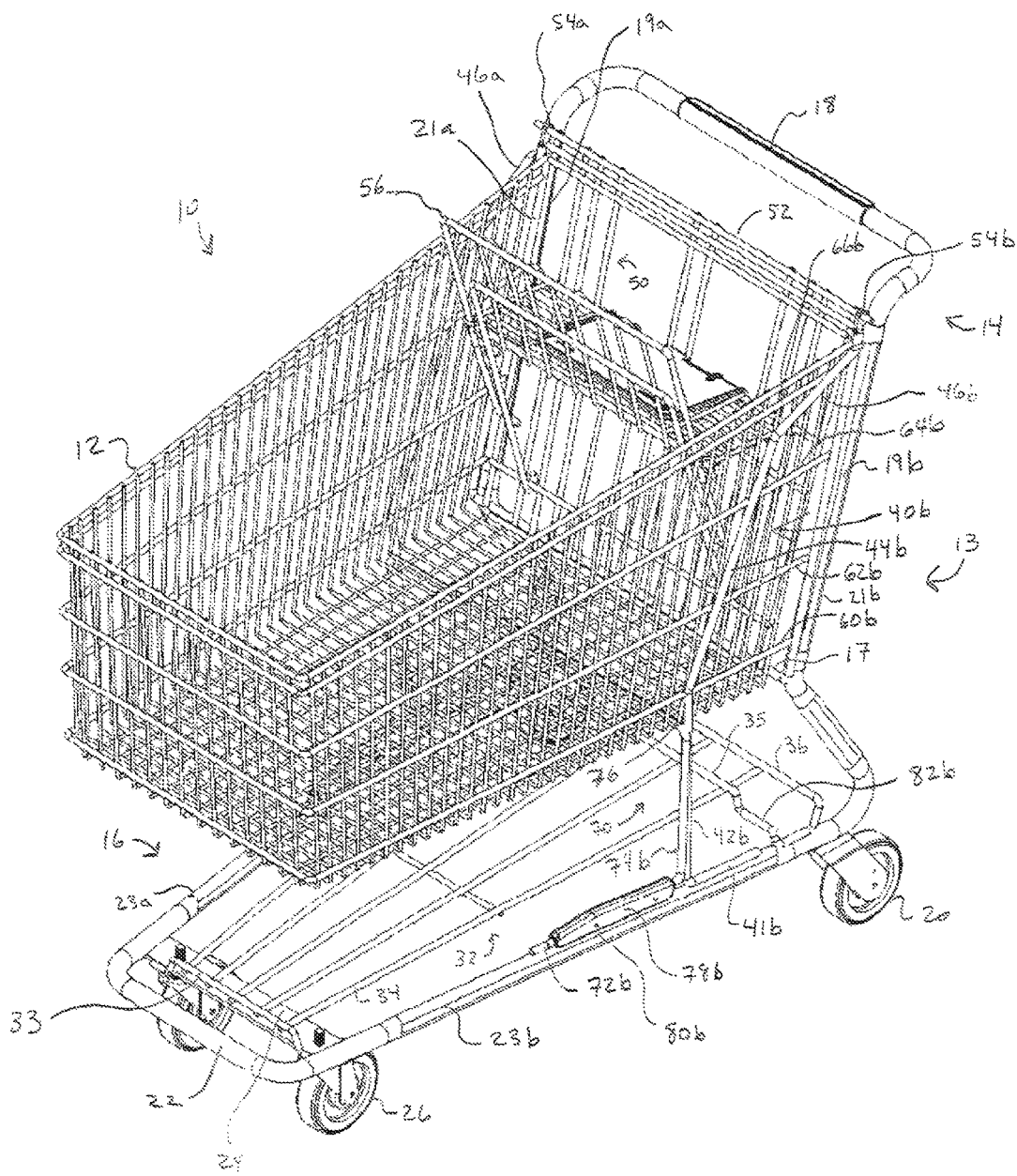
FIG. 1 is a perspective view of an embodiment of the shopping cart of the present invention.

An embodiment of the shopping cart of the present invention is indicated in general at 10 in FIGS. 1-4. The cart includes a basket 12, preferably featuring a conventional metal wire construction. The cart also includes a frame, indicated in general at 13, that forms a handle portion, indicated in general at 14, and a chassis portion, indicated in general at 16.

The handle portion 14 features a generally upside-down U-shape so that a griping portion 18 is formed at the top and a pair of upright members 19a and 19b extend down from the gripping portion. A pair of rear casters 20 are pivotally attached to the trailing ends of a pair of chassis side rails 23a and 23b, near their junction with the upright members 19a and 19b, respectively. A gate frame features a generally horizontal portion 17 that extends between the bottom ends of a pair of upright portions 21a and 21b that are longitudinally attached to upright members 19a and 19b.

The trailing edges of sidewalls of the basket 12 are secured to the upright members 19a and 19b of the handle 14 by the gate frame upright portions 21a and 21b, respectively, such as by welding or other fastening arrangements known in the art. The trailing ends of the basket floor wires are secured to the horizontal portion 17 of the gate frame.

The chassis portion 16 of the frame generally features a pair of side rails 23a and 23b that taper towards one another and are joined by a nose 22 at the front of the cart. As a result, the chassis 16 tapers to a narrower width dimension towards the nose of the cart. A front caster strip 24 is secured to and traverses the space between opposing sections of the pair of side rails 23a and 23b of the frame near the nose 22 and a pair of front casters 26 are attached to the front caster strip.

The handle gripping portion 18, pair of handle upright members 19a and 19b, pair of chassis side rails 23a and 23b and nose 22 are preferably constructed from a single piece of steel tubing with a butt weld at the nose, handle, or any other suitable location for manufacturing. Other materials, both metallic and non-metallic, may be used in place of the steel tubing.

A lower shelf, indicated in general at 32, is formed by a number of longitudinal wires 34, attached by their leading ends to a front bracing wire 33 attached to the front caster strip 24. A pair of rear tray wires 35 and 36 are attached across the trailing end portions of the longitudinal wires 34 and to frame side rails 23a and 23b, preferably by welding. As will be explained in greater detail below, the rear tray wires 35 and 36 have three purposes: they provide 1) the nesting stop 2) the lift feature for the caster lift wire and 3) the tray support.

Figure 2:
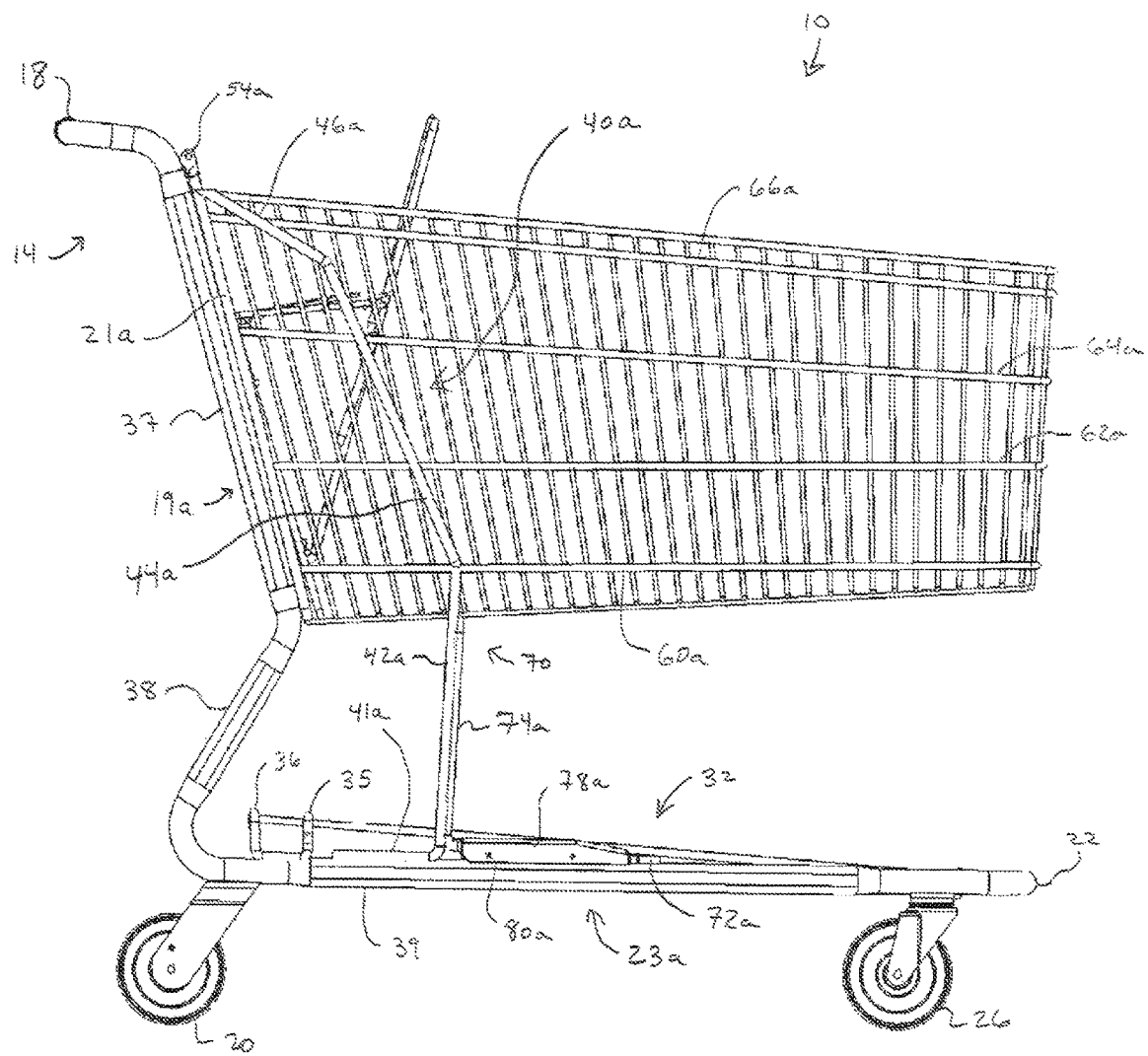
FIG. 2 is a side elevational view of the cart of Fig. I.

Both the handle 14 and chassis 16 of the cart 10 are preferably formed from round tubing with most of the cross section deformed to an ellipse, as described in commonly owned U.S. Pat. No. 7,090,230, the contents of which are hereby incorporated by reference. With reference to FIG. 2, the handle and chassis portions of the cart frame indicated at 37, 38 and 39 are deformed or smashed to form an elliptical cross section.

Leaving handle gripping portion 18 as a round tube (as opposed to providing it with an elliptical shape) provides a familiar grip.

The shopping cart 10 is also provided with a pair of basket supports, indicated in general at 40a and 40b in FIGS. 1 and 2. Each basket support 40a and 40b is preferably formed from a single wire, but a multiple piece structure may be used for each support instead.

As illustrated in FIGS. 1 and 2, the each basket support features a bottom end that terminates in rearward-turned base portions 41a and 41b that are generally horizontal and welded to the pair of chassis side rails 23a and 23b, respectively. In addition to the base portions 41a and 41b, as illustrated in FIGS. 1 and 2, the basket support wires 40a and 40b each feature a pair of forward tilting lower portions 42a and 42b and a pair of rearward tilting upper portions 44a and 44b. The top end portions 46a and 46b of the basket supports 40a and 40b tilt back at a greater angle (from vertical) than the rearward tilting upper portions 44a and 44b and terminate adjacent to the upper ends of the upright portions 21a and 21b of the gate frame.

Figure 3:
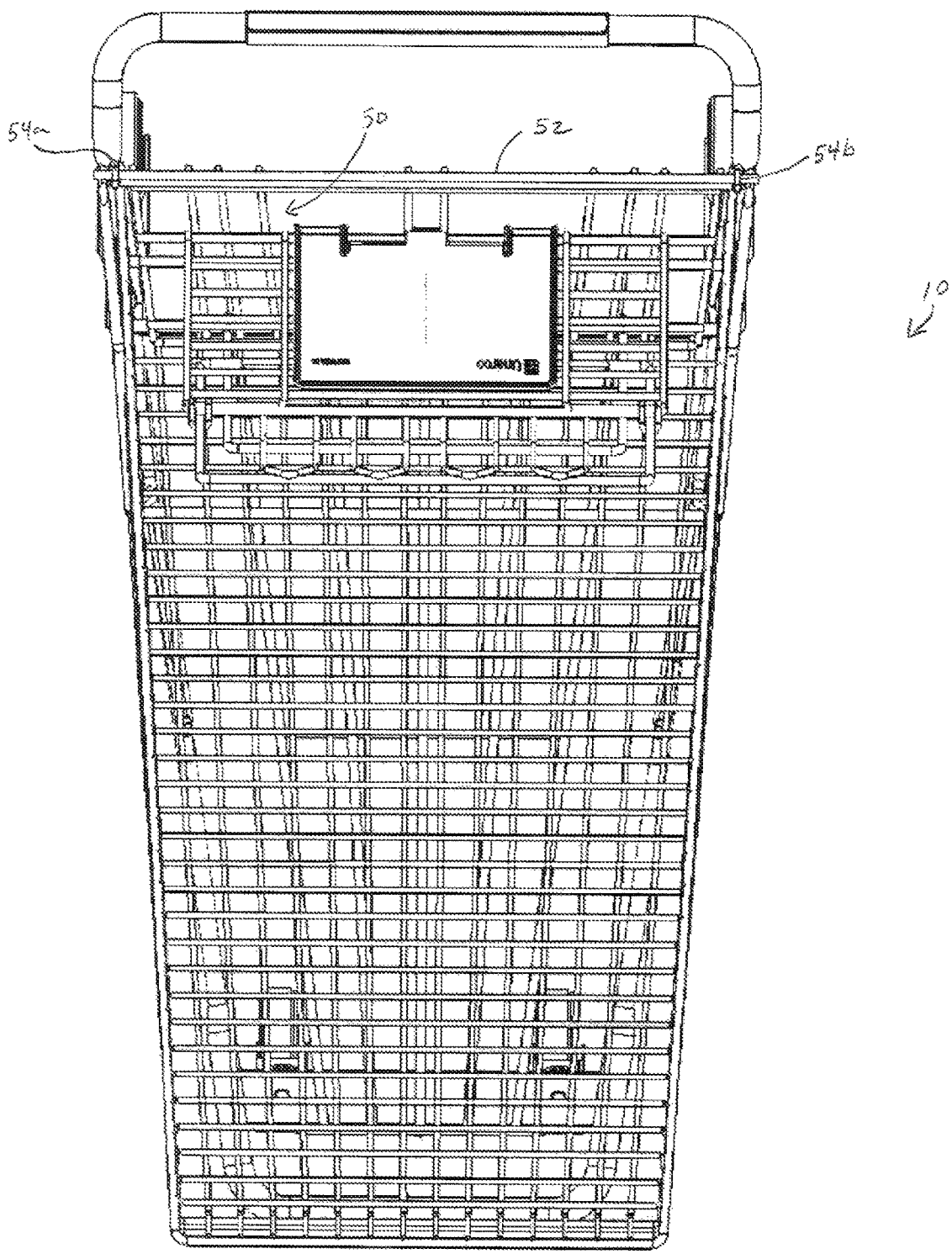
FIG. 3 is a top plan view of the cart of FIGS. 1 and 2.

As illustrated in FIGS. 1 and 3, a gate, indicated in general at 50, forms the back wall of the cart basket 12 and is constructed from a number of vertical and horizontal wires. The gate includes a generally horizontal top wire 52 with end portions that engage apertures 54a and 54b formed at or near the top ends of the upright portions 21 a and 21b of the gate frame so as to form a hinge. As a result, the gate may be rotated upwards, about an axis defined by the top wire 52, so that the basket portion of a second cart may be inserted nose-first into basket 12 in a nested fashion for storage and transport of the carts.

As is known in the art, a folding child carrier 56 includes a child seat and is pivotally attached to cross-wires of the gate 50. The child carrier may be folded between a use position, illustrated in FIGS. 1-3, for carrying a child, and a storage position where it is folded against the gate to provide increased storage capacity in the basket 12.

With reference to FIGS. 1 and 2, the forward tilting lower portions 42a and 42b, rearward tilting upper portions 44a and 44b and rearward tilting top portions 46a and 46b of the basket support are preferably connected to horizontal basket wires 60a, 62a, 64a and 66a and 60b, 62b, 64b and 66b, respectively, preferably by welding. Connections between the basket supports and some (or all) of the horizontal wires may optionally be omitted and alternative fastening arrangements known in the art, such as adhesive, fasteners, etc. may be used to secure the basket support to the horizontal basket wires.

Figure 4:
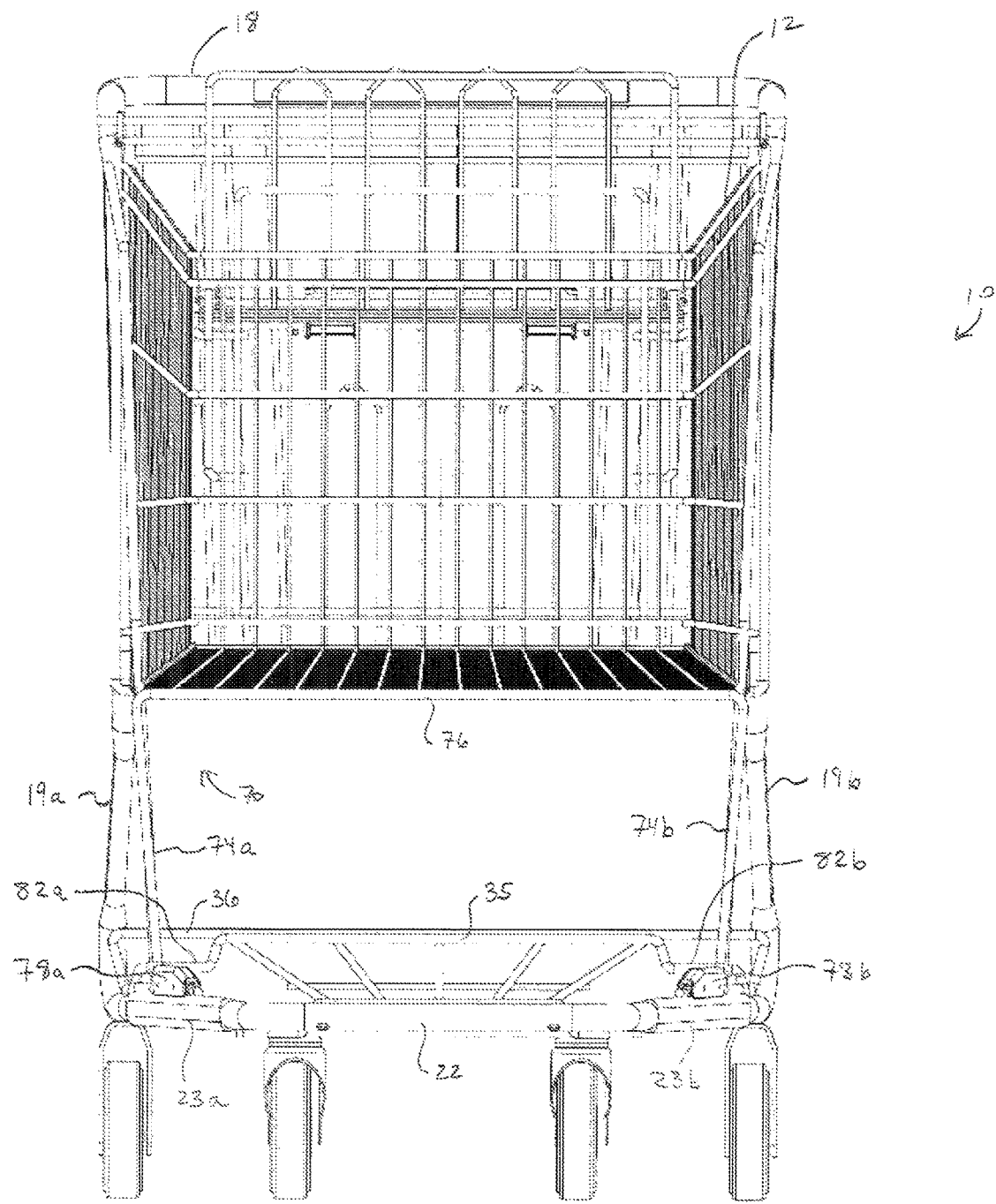
FIG. 4 is a front elevational view of the cart of FIGS. 1-3.

A bridge member, indicated in general at 70 in FIGS. 1, 2 and 4, provides further support for the basket 12. The bridge member, which is preferably constructed from steel wire, includes a pair forward-turned base portions 72a and 72b that are generally horizontal and are welded to the pair of chassis rails 23a and 23b to form caster lift wires. The caster lift wires are preferably provided with covers 78a and 78b, which are preferably formed from plastic and secured in place by rivets 80a and 80b. As a result, caster lifts are formed on top of each chassis side rail 23a and 23b. The caster lift wires 72a and 72b are preferably formed from wire having a diameter of approximately 0.35 inches, but other types of wire may be used. The plastic caster lift covers 78a and 78b address paint adhesion/wear/rust problems.

As best illustrated in FIGS. 1 and 4, the bridge wire also features a pair of generally vertical portions 74a and 74b that are joined at their top ends by a horizontal section 76 that supports the bottom of basket 12 and is preferably secured thereto by welding. The bridge member may be formed from a single piece of steel wire that is bent into the proper shape, but may alternatively be formed of multiple pieces that may not necessarily be steel wire.

With reference to FIGS. 1 and 4, when the cart 10 is nested with a cart of a similar construction, the caster lift covers 78a and 78b of the rear-most cart engage the undersides of step-down portions 82a and 82b of rear tray wire 35 of the front-most cart so that the rear caster wheels 20 of the front-most cart are raised. The rear tray wire 36 of the front-most cart engages the pair of generally vertical portions 74a and 74b of the rear-most cart so as to serve as a nesting stop.

The shopping cart 10 described above supports the basket 12 so as to improve the cargo weight hauling capacity of the cart. The shopping cart 10 features a rugged, attractive and efficient construction. Embodiments of the cart allow a tight nesting distance (9 inches, as an example only) while maintaining a good structural support forward to support a high load (a 1200 pound proof load, as an example only).

The construction of the embodiment of the shopping cart described above also offers savings with regard to materials cost. In addition, the caster lift design is very strong yet economical to produce.

While the preferred embodiments of the invention have been shown and described, it will be apparent to those skilled in the art that changes and modifications may be made therein without departing from the spirit of the invention, the scope of which is defined by the following claims.

The invention claimed is:
1. A shopping cart comprising:
 a frame forming a handle portion and a chassis portion, where the handle portion includes a pair of upright members and the chassis portion includes a pair of side rails;
 a basket attached to the upright members of the handle portion, said basket having a bottom portion, said basket further having a plurality of horizontal basket wires;
 a pair of basket supports positioned on opposite sides of the basket and including:
  i. a pair lower portions attached to the pair of side rails of the chassis portion, said pair of lower portions having a pair of top end portions attached to the bottom portion of the basket; and
  ii. a pair of upper portions having a pair of top end portions attached to the handle portion of the frame and a pair of bottom end portions attached adjacent to the bottom portion of the basket and the pair of top end portions of the pair of lower portions, wherein each upper portion is connected to a plurality of horizontal basket wires;
 a first rear tray wire;
 a bridge member including a pair of generally vertical portions joined to a generally horizontal section joining the pair of generally vertical portions, where the horizontal section supports a bottom of the basket; and
 a second rear tray wire positioned rearward of the first rear tray wire, said second rear tray wire engaging the pair of generally vertical portions of the bridge member of a second shopping cart having a construction similar to the shopping cart to serve as a nesting stop when the second shopping cart and the shopping cart are nested.

2. The shopping cart of claim 1, wherein the pair of lower portions are forward tilting.

3. The shopping cart of claim 1, wherein the pair of upper portions are rearward tilting.

4. The shopping cart of claim 1, wherein the pair of lower portions are attached to the basket.

5. The shopping cart of claim 1, wherein the pair of upper portions are attached to the basket.

6. The shopping cart of claim 3, wherein the top end portions of the pair of rearward tilting upper portions of the pair of supports tilt rearward at a greater angle from vertical than remaining portions of the rearward tilting upper portions of the pair of supports.

7. The shopping cart of claim 1, wherein each of the top end portions of the upper portions of the pair of supports are connected to at least one horizontal basket wire.

8. The shopping cart of claim 1, wherein each of the pair of basket supports is a single piece of steel wire.

9. The shopping cart of claim 1, wherein the frame is formed of tubing and the pair of side rails of the chassis portion of the frame each includes a portion having an elliptical cross-section.

10. The shopping cart of claim 9, wherein the elliptical portion has a generally vertical longitudinal axis.

11. The shopping cart of claim 1, wherein the frame is formed of tubing and the pair of upright members of the handle portion of the frame each includes a portion having an elliptical cross-section.

12. The shopping cart of claim 11, wherein the elliptical portion has a generally horizontal longitudinal axis.

13. The shopping cart of claim 1, further comprising:
 a pair of caster lifts secured to the pair of side rails of the chassis portion of the frame;
 a lower shelf supported between the pair of side rails of the chassis portion of the frame, where a trailing end of the lower shelf is supported by the first rear tray wire;
 said first rear tray wire being engaged by caster lifts of a second shopping cart having a construction similar to the shopping cart when the shopping cart and the second shopping cart are nested.

14. The shopping cart of claim 13, wherein the first rear tray wire features a pair of step-down portions that are engaged by the caster lifts of the second shopping cart when the shopping cart and second shopping carts are nested.

15. The shopping cart of claim 14, further comprising: a front caster strip, to which a pair of front casters are attached, and a front bracing wire attached to a leading end of the lower shelf.

16. A shopping cart comprising:
a frame forming a handle portion and a chassis portion, where the handle portion includes a pair of upright members and the chassis portion includes a pair of side rails;
a basket attached to the upright members of the handle portion, said basket having a bottom portion, said basket further having a plurality of horizontal basket wires;
a plurality of casters attached to the chassis portion;
a pair of basket supports positioned on opposite sides of the basket and including:
  i. a pair of forward tilting lower portions attached to the pair of side rails of the chassis portion, said pair of forward tilting lower portions having a pair of top end portions attached to the bottom portion of the basket; and
  ii. a pair of rearward tilting upper portions having a pair of top end portions attached to the handle portion of the frame and a pair of bottom end portions attached adjacent to the bottom portion of the basket and the pair of top end portions of the pair of forward tilting lower portions, wherein each upper portion is connected to a plurality of horizontal basket wires;
a first rear tray;
a bridge member including a pair of generally vertical portions joined to a generally horizontal section joining the pair of generally vertical portions, where the horizontal section supports a bottom of the basket; and
a second rear tray wire positioned rearward of the first rear tray wire, said second rear tray wire engaging the pair of generally vertical portions of the bridge member of a second shopping cart having a construction similar to the shopping cart to serve as a nesting stop when the second shopping cart and the shopping cart are nested.

17. The shopping cart of claim 16, wherein the top end portions of the pair of rearward tilting upper portions of the pair of supports tilt rearward at a greater angle from vertical than remaining portions of the rearward tilting upper portions of the pair of supports.

18. The shopping cart of claim 17, wherein the top end portions of the pair of rearward tilting upper portions of the pair of supports are adjacent the basket.

* * * * *